(12) United States Patent
Mebane, III

(10) Patent No.: US 7,191,224 B2
(45) Date of Patent: Mar. 13, 2007

(54) COMPUTER-IMPLEMENTED DATA MESSAGING RING

(75) Inventor: Cummins Aiken Mebane, III, Cary, NC (US)

(73) Assignee: SAS Institute Inc., Cary, NC (US)

( * ) Notice: Subject to any disclaimer, the term of this patent is extended or adjusted under 35 U.S.C. 154(b) by 896 days.

(21) Appl. No.: 10/074,984

(22) Filed: Feb. 13, 2002

(65) Prior Publication Data

US 2003/0154260 A1    Aug. 14, 2003

(51) Int. Cl.
*G06F 12/04* (2006.01)

(52) U.S. Cl. ............ 709/213; 709/203; 709/216; 711/118

(58) Field of Classification Search ........... 709/213, 709/203, 216; 710/306; 711/118, 154; 714/6
See application file for complete search history.

(56) References Cited

U.S. PATENT DOCUMENTS

| | | | |
|---|---|---|---|
| 6,202,169 B1* | 3/2001 | Razzaghe-Ashrafi et al. | .. 714/6 |
| 6,330,605 B1* | 12/2001 | Christensen et al. | ........ 709/226 |
| 6,665,705 B1* | 12/2003 | Daniels-Barnes et al. | ... 709/203 |
| 2002/0062417 A1* | 5/2002 | Rudland et al. | ............ 710/306 |
| 2002/0184327 A1* | 12/2002 | Major et al. | ................. 709/213 |

* cited by examiner

*Primary Examiner*—Pierre-Michel Bataille
(74) *Attorney, Agent, or Firm*—Jones Day

(57) ABSTRACT

A computer-implemented system and method for communicating among a plurality of computer-based machines that are interconnected through a network. The method and system utilize a first group of computer modules that operate on a first machine as well as a second group of computer modules that operate on a second machine. The modules of the first and second groups exchange messages over a data network ring. Any one of the modules in the first group may operate as a proxy that is responsible for messages sent to or from the first machine over the data network ring. Any one of the modules in the second group may operate as a proxy that is responsible for messages sent to or from the second machine over the data network ring.

51 Claims, 8 Drawing Sheets

COMPUTER-IMPLEMENTED DATA MESSAGING RING

BACKGROUND OF THE INVENTION

1. Technical Field

The present invention is generally directed to computer application communication, and more specifically to the field of computer application and network information updating.

2. Description of the Related Art

In a component-based software system it is often needed to reflect changes in several views simultaneously. If a user changes data and that data appears in several views on the desktop, there is an expectation that the change is universally reflected without user action. There are also many cases where several running instances of a component or application need to communicate dynamically to reflect a change. Changing an option for example in one copy of an application may need to be reflected in other currently executing copies. Typically the last copy closed dictates what value of the option is saved. Such an approach lacks an efficient and effective dynamic communication between applications and components.

A software design paradigm exists that is often known as the publish-subscribe design pattern. Early forms were implemented as electronic mail distribution mechanisms such as the popular Listserve system that uses a central server process to manage subscriptions. A email message sent to the list is then forwarded to all subscribers. Microsoft's MSMQ and IBM's MQ series are examples of modern message queue systems that extend message delivery for more generalized distributed applications. These systems require a server process, administration overhead, subsystem component installation, and are generally unsuitable for object level communication. A much more simplified, low overhead mechanism is needed to address the needs and problems present in these and other systems.

SUMMARY OF THE PRESENT INVENTION

The present invention addresses the limitations of the aforementioned approaches as well as others. The present invention includes a computer-implemented system and method for providing communications among a plurality of computer-based machines that are interconnected through a network. The method and system utilize a first group of computer modules that operate on a first machine as well as a second group of computer modules that operate on a second machine. The modules of the first and second groups exchange messages over a data network ring. Any one of the modules in the first group may operate as a proxy that is responsible for messages sent to or from the first machine over the data network ring. Any one of the modules in the second group may operate as a proxy that is responsible for messages sent to or from the second machine over the data network ring.

BRIEF DESCRIPTION OF THE DRAWINGS

The present invention satisfies the general needs noted above and provides many advantages, as will become apparent from the following description when read in conjunction with the accompanying drawings, wherein.

DETAILED DESCRIPTION

Figure 1:
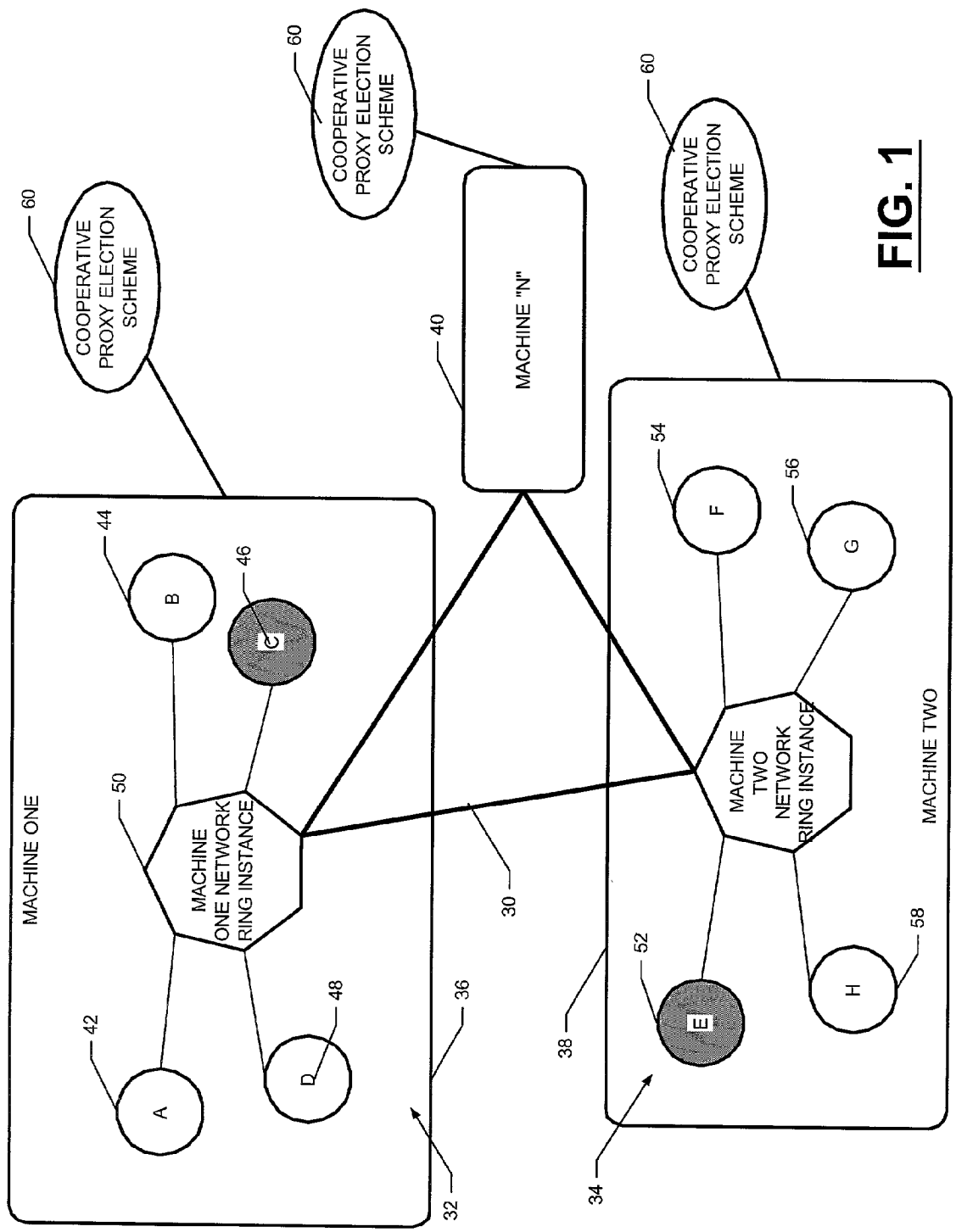
FIG. 1 is a block diagram depicting a message ring.

FIG. 1 depicts a distributed message ring 30 that allows software entities or modules (32 and 34) at an object level to communicate with each other anonymously. The software modules (32 and 34) may be an application, a visual component, or simply an internal program object. Unlike a traditional publisher-subscriber paradigm, the distributed message ring 30 is completely peer-level meaning that there is no controlling computer or server. Any object may send or receive messages with no prior knowledge of the sender or recipient. All messages may be sent (but not necessarily) asynchronously so that the sending object does not block the hosting thread of execution.

The distributed message ring 30 is comprised of one or more member object instances (32 and 34) that form a logical ring topology. Each instance of a distributed message ring object (32 and 34) is a logical interface to that particular ring. All objects (32 and 34) are equal members of the ring 30 and share any overhead to implement the ring. There are no external objects or processes required beyond common operating system services.

As members of a ring 30, software modules (32 and 34) join, leave, broadcast messages, manage and perform other operations with respect to the ring 30. The ring members (32 and 34) may reside entirely within the same machine (e.g., machine one 36) or may be distributed across multiple machines (e.g., machines 36, 38, 40). The scope of a ring can be limited to a process, a machine, or a domain while a message may be sent with a scope less than or equal to the scope of the ring. For example, if the ring scope is limited to machine one 36, then software modules A, B, C, and D (42, 44, 46, 48) may form a ring 50. If the ring scope is at a network level, then software modules A, B, C, D, E, F, G, and H (42, 44, 46, 48, 52, 54, 56, 58) may form the ring 30.

The responsibility for maintaining the logical ring is shared equally by all members dynamically and, therefore, an object may join or leave the ring at any time. In one configuration, a ring member is elected per machine through a cooperative proxy election scheme 60 to act as a proxy for the ring. For example, member C may act as the proxy for ring 30 for machine one 36; while member E 52 may act as a proxy for ring 30 for machine two 38. The proxy election process 60 is solely contained and conducted within the distributed message ring objects (32 and 34). Accordingly, the distributed message ring 30 does not use a central server process or common process to maintain the ring 30 as is necessary for a publisher-subscriber service.

It is to be understood that the distributed message ring described herein is language and platform independent. For clarity purposes, a C++ like syntax is used to describe the interfaces. However, it should be understood that the distributed message ring may be implemented in any object oriented or procedural programming language on a variety of computer platforms.

Figure 2:
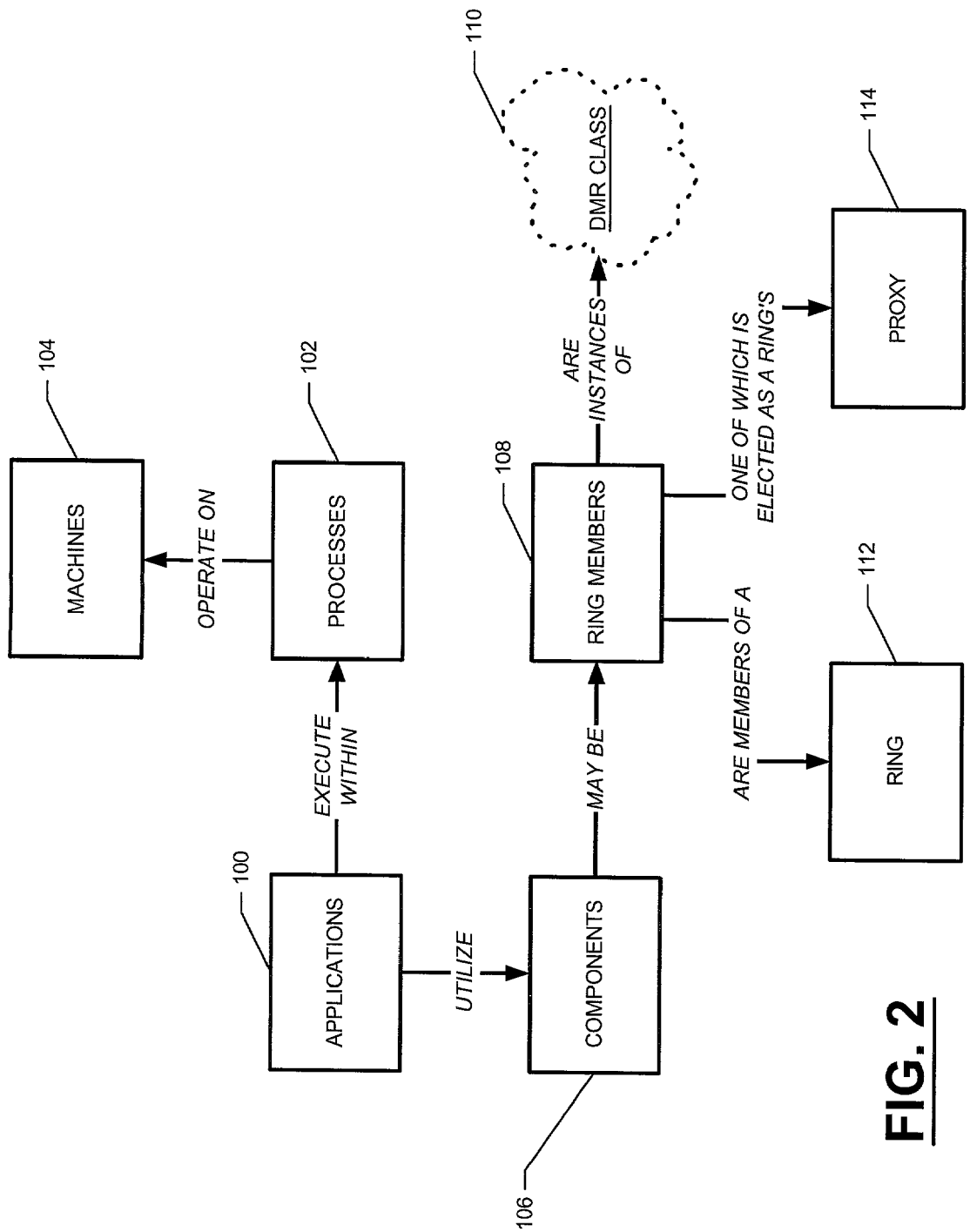
FIG. 2 is a block diagram depicting computer and software mechanisms used in a message ring.

FIG. 2 describes how different computer and software mechanisms within a distributed message ring interrelate. Applications 100 are software programs that execute as processes 102 on machines 104. They may access zero or more logical components 106 which are typically independent and generally reusable pieces of software.

A ring member 108 is an instance of the distributed message ring class 110 for a specified ring 112. One of the ring members is elected as the ring's proxy 114. An "object" is usually defined as an instance of a class. Because the distributed message ring 112 is designed as a class, it may be used as a data member (not to be confused with ring member) of another class. For example an application with two data views may have an instance of a distributed message ring class in each view and another in the application class. There may be three members of this ring on a machine where the process is executing. Each view could be a software component (as defined by a platform component architecture such as Microsoft Component Object Model or Java Enterprise Java Beans). Because the distributed message ring works at an object level however such distinctions are irrelevant so the three members may communicate independent of their containing entities. Such an approach allows reusable components to operate as loosely coupled, low overhead mechanisms and to communicate without prior knowledge of their existence, location, and state.

Figure 3:
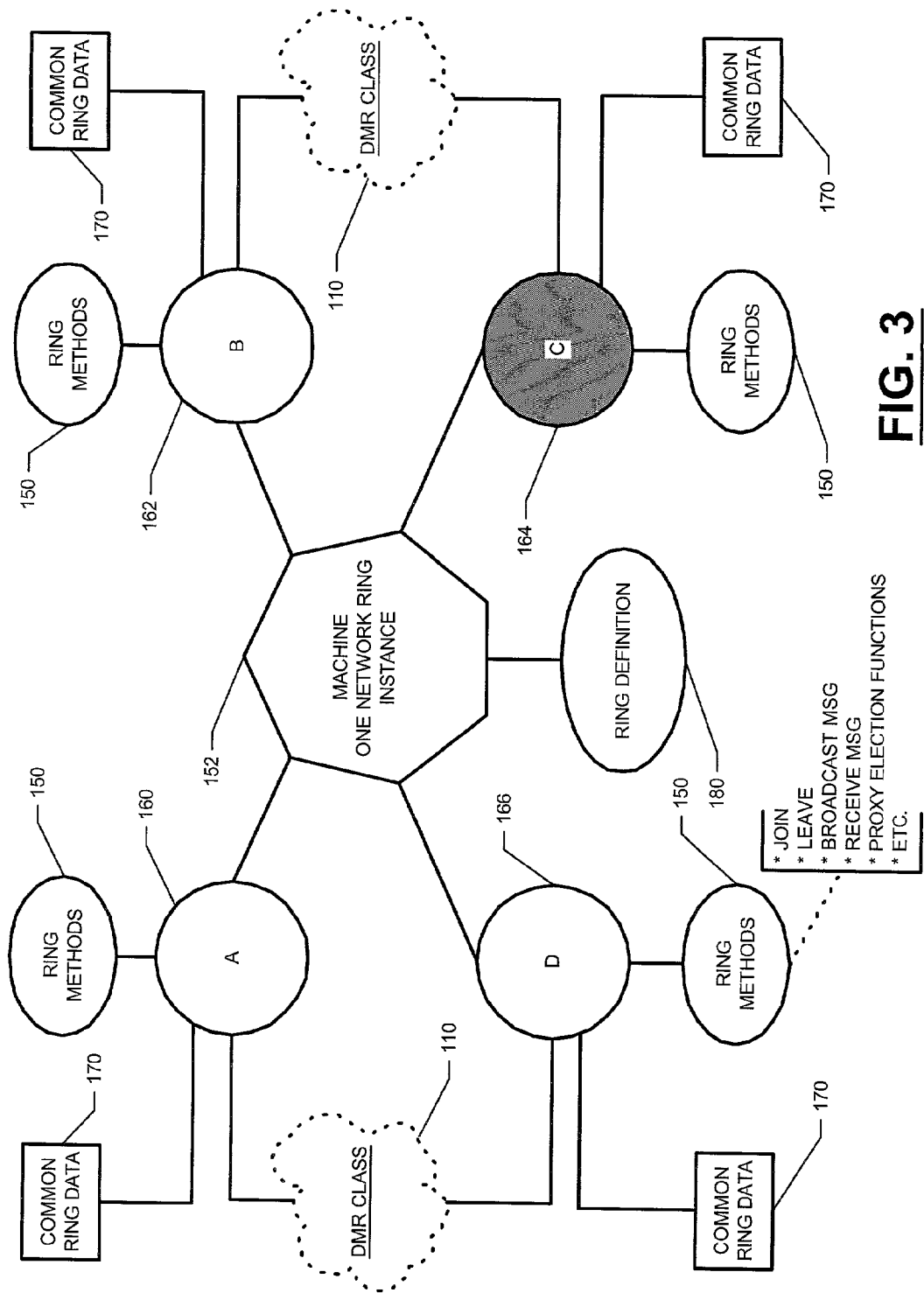
FIG. 3 is a block diagram depicting methods used by members in a message ring.

FIG. 3 depicts exemplary methods 150 used by members in a message ring 152. In FIG. 3, members A, B, C, and D (160, 162, 164, 166) are instances of the distributed message ring class 110. These objects may be contained by any other object as a class member. In this case instance C 164 is the proxy which means that it will perform some extra duties (e.g., forwarding of messages to and from other rings). Additionally, common ring data 170 (per machine) contains the process ID of the current proxy. Each instance loads an identical copy of this data and therefore recognizes if they should be the first proxy (e.g., processID=0) or whether another instance is already performing this duty. There is a single proxy for a given ring per machine.

To construct a distributed message ring object (instance of the class), a name and scope are used. The scope is used for the first instance to establish the ring and is used in subsequent instances to ensure each one has requested the same scope. A ring may have a ring definition 180 that is established by (1) a unique ring name; and (2) a scope of process, machine, or network. Using a UUID (universally unique identification) strategy ensures the uniqueness of the name if there is a concern of name-space collision. Members wishing to join the ring agree upon the scope of the ring to avoid any ambiguities. An instance of a distributed message ring object specifies the ring name and scope during construction. The scope is verified upon any operation to ensure this member matches the scope of the ring. This enforces that every object joining a ring has full knowledge of the boundaries for message sending and receipt. A message may be sent on the ring at any time with a scope that is less then the scope of the ring. This allows a message to be sent only to members within a given process even if the ring has a machine or network scope.

Based on this specification, the constructor of a ring instance could be defined as follows (where "DMR" stands for distributed message ring):

DMR(String, RingName, DMRScope Scope)

Each instance of a distributed message ring object that is constructed with the same RingName is eligible to participate in this ring. An object constructed with a different RingName is part of another independent ring that will have no interaction with a ring bearing a different name.

Once an instance is constructed there are two methods available for ring participation. First, the Join( ) method places in a distributed message ring instance in the ring such that it is now eligible to receive messages. Second, the Leave( ) method reverses the Join( ) behavior so that the object will no longer receive any messages placed on the ring. A distributed message ring member may Join or Leave a ring at any time.

Sending a message to other members of a ring is accomplished with the Broadcast method. A member may broadcast on the ring without joining the ring. This call is non-blocking so the calling process does not wait for the message to be delivered to the recipients. The method may be defined as:

Broadcast(Integer MessageID, String MessageData,
  Integer GroupID=1, DMRScope Scope=Ring)

The MessageID may be chosen by the software developer to have a specific meaning for a particular ring. The distributed message ring does not place any restrictions or conventions on this parameter, although they should be unique for a particular ring as defined by the RingName. For example, a ring designed to propagate a change in data status between view components may choose the value of 101 to represent a refresh request. Any ring member receiving this message should initiate a refresh operation while using any pertinent data contained in the MessageData parameter. Using an integer value for MessageID enables the consuming object to quickly map an action in response to the message. Message-specific data may be sent using the MessageData parameter. Any type of data that may be formatted into a string can be used. The GroupID parameter may be used to optionally group a series of messages together. A value of 1 is a default that tells the recipient that the message is not part of a group. The Scope override parameter is also optional. The default value specifies that the message be sent to all ring members. A scope that is more restrictive then the ring scope may also be specified. In this case only certain members meeting the criteria will receive the message.

A distributed message ring object receives a message through an event or callback mechanism. This reference uses a virtual function to call into a derived class when a message arrives. A software object or component may then initiate some action based on the message receipt. For example, the function may be defined as follows:

virtual OnMessage(Integer MessageID, String MessageData, Integer GroupID)

The parameters are the values that were passed on the Broadcast call previously described. A GroupID value of greater the one means that several related messages are to be sent. An approach may call for the value to be used as reverse sequence. For example three related messages could be grouped together with this exemplary sequence of calls:

Broadcast(101,"this is data part one",3)

Broadcast(101),"this is data part two",2)

Broadcast(101, "this is data part three",1)

In this case the recipient knows upon receipt of the first message that there will be a total of three and that they will be received in order. The distributed message ring architecture allows this feature to be used in a manner determined by the design of the software using the distributed message ring. The specification provides in one configuration that the GroupID value integer is passed to the recipient and that the messages will arrive in the order that they are broadcast.

The following provides an example of a class definition 110 for use by ring member:

```
class CSASDMR
{
public:
    //----- scope
    enum
{SCOPE_RING,SCOPE_PROCESS,SCOPE_MACHINE,SCOPE_NETWORK}
DMRScope;
    //----- constructor
    CSASDMR(String RingName, DMRScope Scope);
    //----- destructor
    virtual ~CSASDMR();
    //----- join the ring
    BOOL Join();
    //----- leave the ring
    BOOL Leave();
    //----- send a message
    //----- scope may be LESS then original ring but never greater, SCOPE_RING
requests whatever was set when created
    BOOL Broadcast(integer Message, String MessageData, integer GroupID=1,
DMRScope Scope=SCOPE_RING);
    protected:
    //----- called when a message arrives
    virtual void OnMessage(integer MessageID, String MessageData, integer
GroupID) {};
    //----- called when an internal message is received
    virtual void OnInternalMessage(integer MessageID, integer Data);
    //----- called when we become a proxy
    virtual void OnProxy() {}
```

Figure 4:
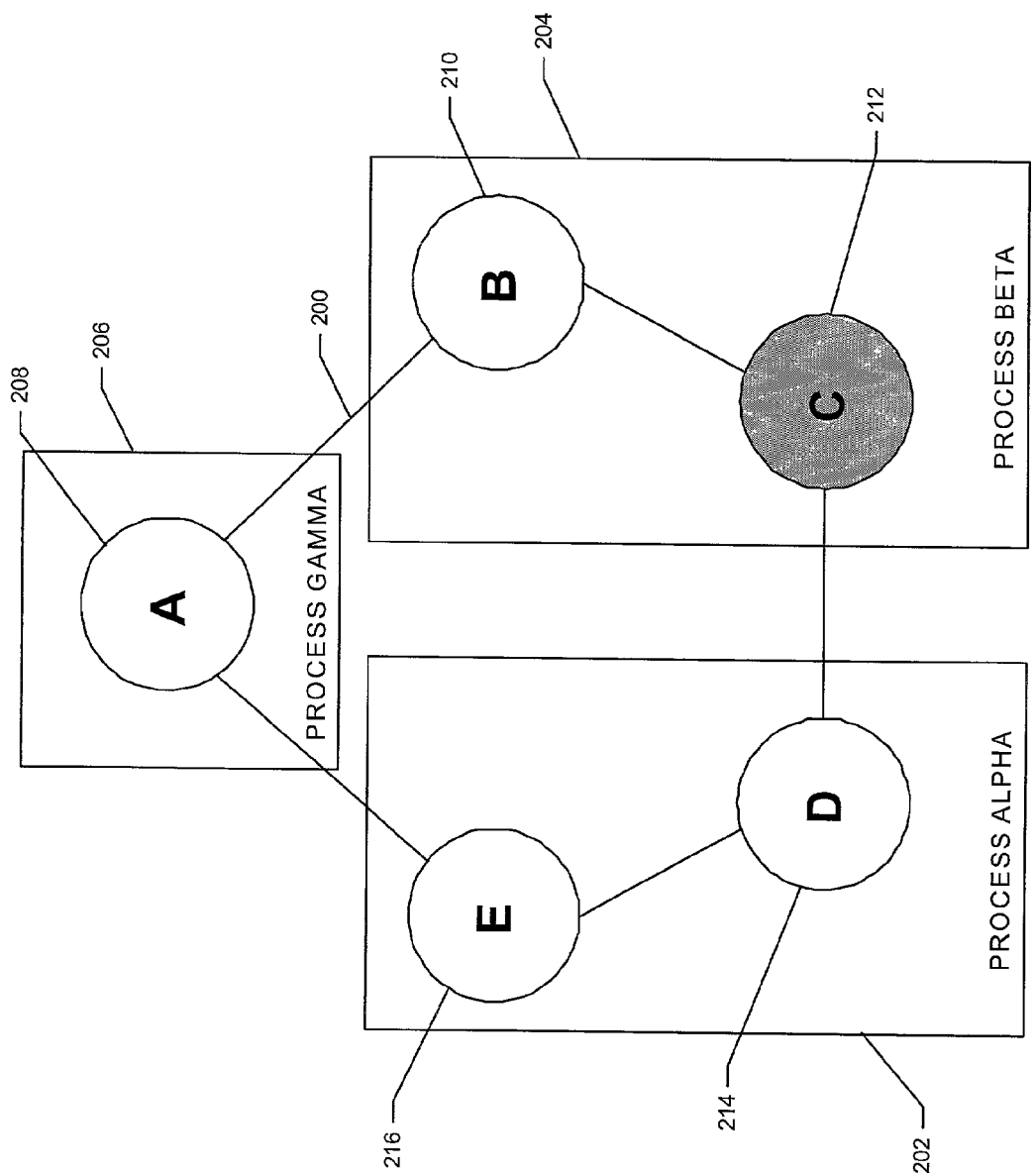
FIGS. 4 and 5 are block diagrams depicting message ring members residing in different processes.
Figure 5:
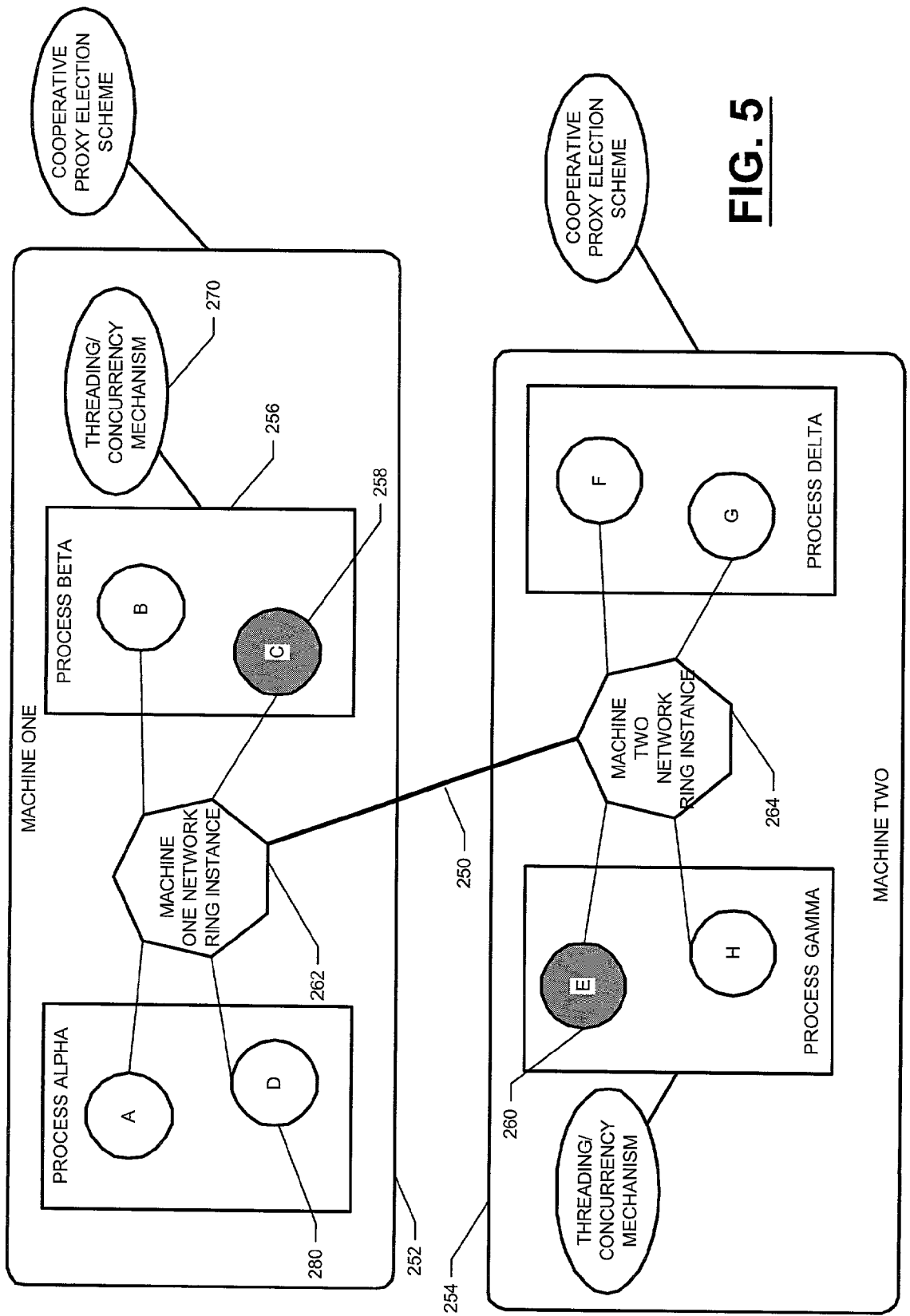

FIGS. 4 and 5 illustrate message ring members residing in different processes. With reference to FIG. 4, a ring 200 is shown having five members (208, 210, 212, 214, 216) that are contained by three separate processes (202, 204, 206). In this example, the ring 200 was created with machine scope meaning that members of the ring would only receive messages that originate on the same machine. A ring with the same RingName on another machine will act independently in the same manner. Using the default scope, member C 212 broadcasts a message. The message is sent to members A, B, C, D, and E (208, 210, 212, 214, 216). If the scope were overridden to a value of process then the message would only be sent to member B 210.

When a ring is instantiated with a scope of Network, the members of the ring may exist on different machines within a network. The individual rings on each machine are linked together with a cooperative proxy strategy that does not require an external process. Instead a single member of the ring on each machine acts as a proxy that exchanges messages with other instances of the ring in the network. This is done without affecting the process that is hosting the proxy.

FIG. 5 illustrates a network ring 250 that has two machines (252, 254) participating along with their respective proxies 258 and 260. As an example, process Beta 256 on machine one 252 is hosting the proxy for the ring 250 on this machine via member C 258 who is an instance of the distributed message ring class. The first member of a network ring will typically act as the proxy for that ring. Member E 260 is the ring proxy for machine two 254. The proxy 260 links instances (262 and 264) of the ring together across machines (252 and 254) in a network. Using a threading or other concurrency mechanism 270 ensures that the process that is hosting the distributed message ring object acting as the proxy is not impacted. These tasks are performed when one of the following two events occur:

(1) A message is sent on the ring—The proxy receives the message as a ring member. It then broadcasts this message to other proxies after adding a header that identifies the originating machine. Using the ring name as part of the message allows the receiving proxy to recognize only messages destined for the ring for which it is acting as a proxy. With reference to FIG. 5, a message may for example be sent on the ring 262 in machine one 252 by member D 280. Member C 258, acting as the proxy for machine one 252, broadcasts the message, along with appropriate header data, to other machines in the network.

(2) A message is received by the proxy—Member E 260 receives the broadcast via some system mechanism such as UDP sockets or an abstraction such as a Microsoft NT Mailslot. By examining the header, the proxy 260 determines that the message is for the ring 264 it is servicing and that the message did not originate on machine two 254. It then sends the message on the machine ring 264 acting as any ring member. The recipients do not have knowledge that the message originated on another machine. Note that depending on the system mechanisms available, the broadcast may be filtered to the extent that only proxies for a given ring will receive it. In this case the operating system is performing part of the validation work leaving the proxy to determine if it originated the broadcast. A proxy typically does not post a message to a machine where it originated.

Figure 6:
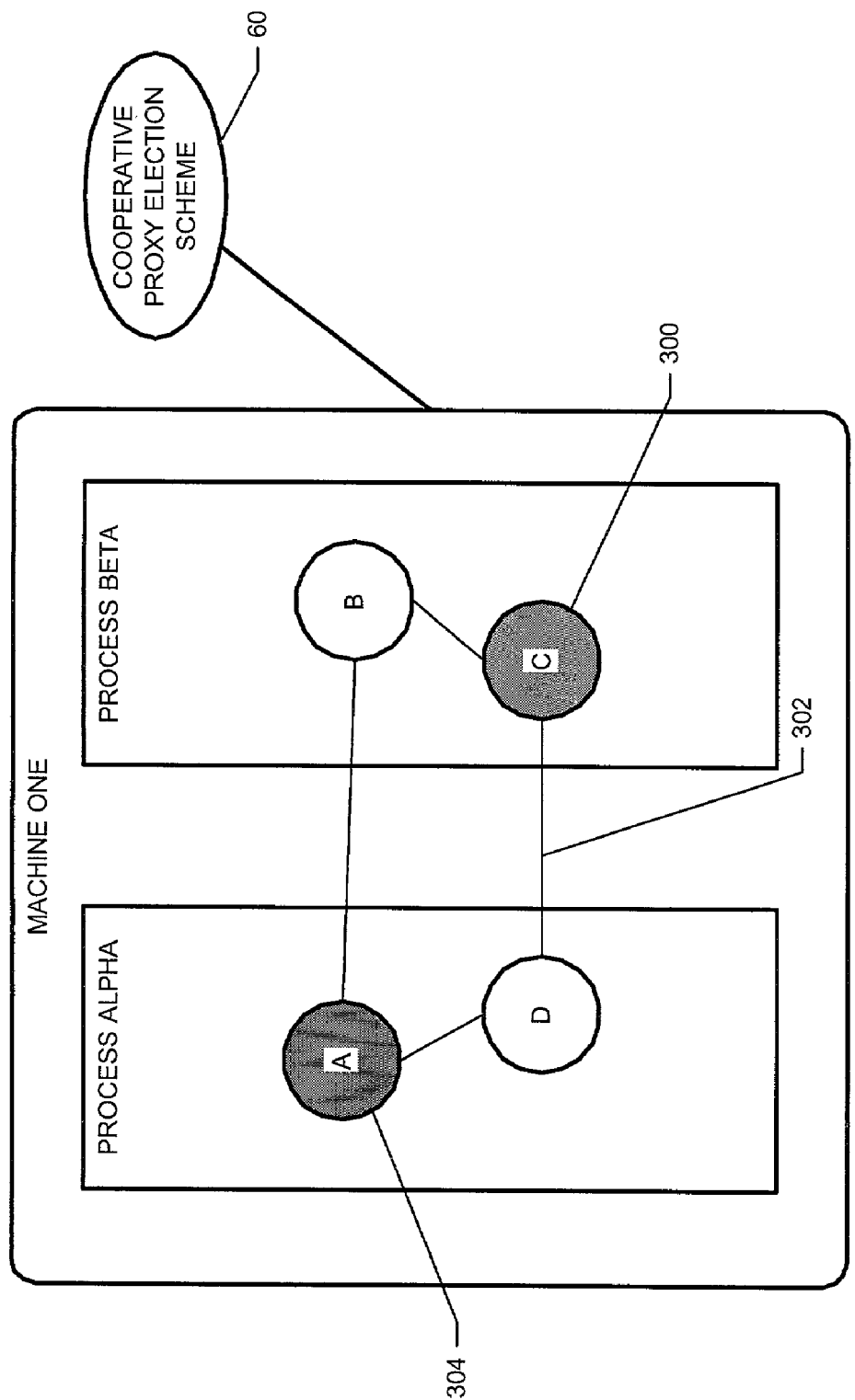
FIG. 6 is a block diagram depicting a proxy election mechanism.

FIG. 6 is a block diagram depicting a proxy election mechanism 60. When a distributed message ring object instance that is acting as the ring proxy is destructed, it needs to find another object to act as proxy. For example, member C 300 may be acting as a proxy for the ring 302. In accordance with the proxy election scheme 60, member A 304 may succeed member C 300 as the ring's proxy. The proxy election process 60 is solely contained and conducted within the distributed message ring objects. Thus, the process of proxy election 60 relieves the burden of maintaining a separate process to exchange messages between rings on different machines. This reduces overhead, user interaction, and allows the distributed message ring functionality to be added easily to software components and applications.

Figure 7:
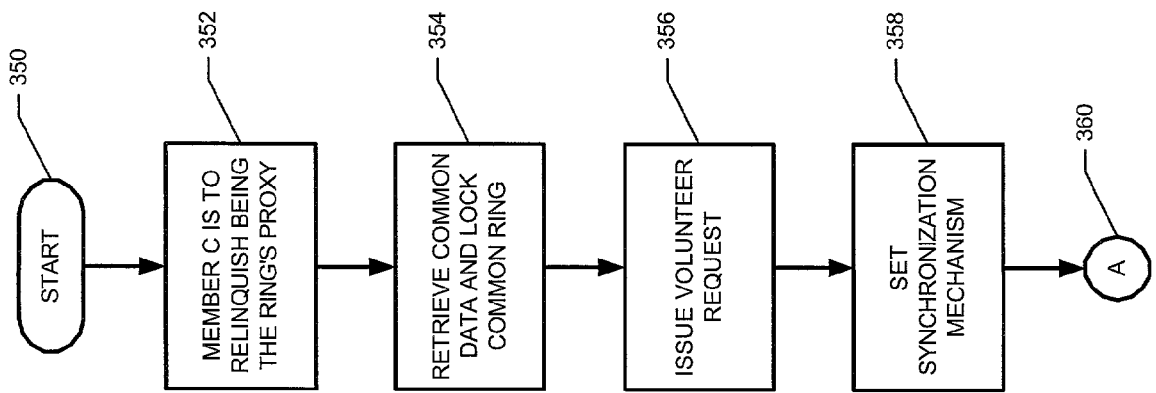
FIGS. 7 and 8 are flowcharts depicting a proxy election process.
Figure 8:
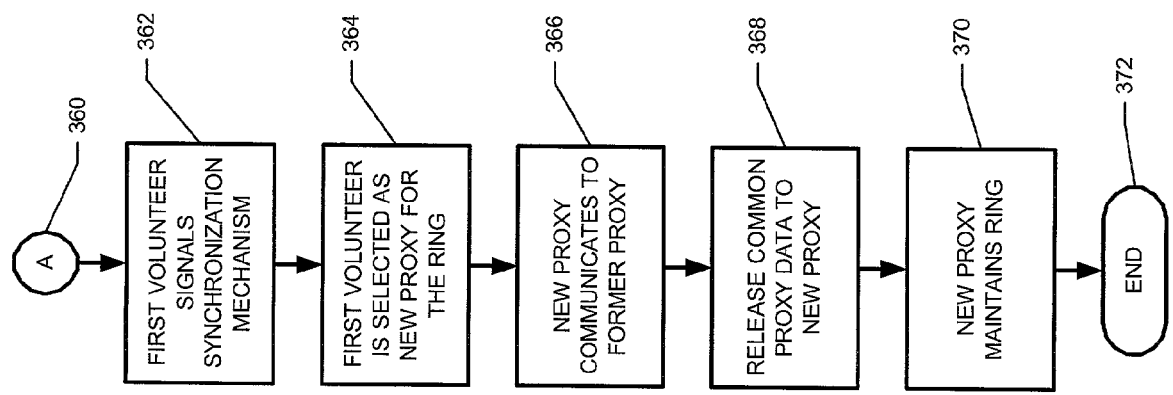

FIGS. 7 and 8 are flowcharts depicting a proxy election process. In this example, member C on the machine is the current proxy. With reference to FIG. 7, the proxy election process starts at block 352 as indicated by the start block 350. At block 352, member C is to relinquish being the ring's proxy by entering the object destruction process. At block 354, the common ring data is retrieved and locked for exclusive use. This prevents activity on the ring until the election is finished.

At block 356, an internal message is sent to all other ring members on the machine requesting a volunteer for the new proxy. This message contains the sender ID so that the volunteer can respond directly. A system level synchronization mechanism such as a semaphore is set at block 358 to ensure only the first volunteer is accepted. Processing continues on FIG. 8 as indicated by the continuation indicator 360.

With reference to FIG. 8, the first ring member to volunteer signals at block 362 the synchronization mechanism. All other participates will now realize a winner has been declared and discard the requesting message. In this case the successful candidate is member A as shown at block 364. At block 366, member A now responds to the original proxy (member C) by sending an internal message containing member A's ID. This is done because the original proxy has exclusive use of the common ring data so it updates the proxy ID on behalf of the newly elected proxy. At block 368, the retiring proxy updates the common proxy data and releases exclusive use. The ring on this machine continues at block 370 with the new proxy.

The preferred embodiment described with reference to the drawing figures is presented only to demonstrate an example of the invention. Additional, and/or alternative, embodiments of the invention should be apparent to one of ordinary skill in the art upon reading this disclosure as the present invention is applicable in many contexts. For example, components used within a web browser on a user desktop may utilize the distributed message ring of the present invention. In such an environment, there is generally no direct mechanism through which such components may communicate. There is limited interaction with the browser through the use of methods and events, however embedded components are usually isolated from any other applications or even instances of the same component. If a change in one component, such as a view of data, needs to be logically reflected in all other views of this data, the use of a distributed message ring allows these components to exchange status updates without the limitations imposed by the browser application boundaries. Such a problem is difficult to address without a mechanism such as a distributed message ring. Using Network scope would allow all consumers of this component within a network to see the current status of the data.

Another example that illustrates the broad range of the claimed present invention is the application of the distributed message ring where multiple instances of an application are running. In this context, a common problem is the synchronization of options when running multiple instances of an application. Typically the last copy closed will persist the current state of the options, effectively overwriting any changes to other copies that were previously closed. By using distributed message ring, each executing instance of the application is notified if an option is changed so that all copies have the same behavior and this behavior is persisted for subsequent executions of the software.

Still further, another example that illustrates the broad range of the claimed present invention is the use of the distributed message ring for a process-level status propagation. Using a scope of Process allows components to reflect status changes that are only meaningful within a given process. An example of this is a situation where two copies of an application are running, each containing two views that should reflect the same state. This state, however, is only relevant within a single instance of the application. The views may be designed to utilize a distributed message ring that is set for Process scope. A change or some other information is now exchanged only between components within the same process. Even though all components are members of the same ring they will only communicate with the members residing in the same process. This process-level isolation allows the view to reflect the current state in each running application.

The invention claimed is:

1. A computer-implemented system for communicating among a plurality of computer-based machines interconnected through a network, comprising:
    a first group of computer modules operating on a first machine;
    a second group of computer modules operating on a second machine; and
    a data network ring connected to the first group and the second group, said modules of the first and second groups exchanging messages over the data network ring,
    wherein any one of the modules in the first group may operate as a proxy that is responsible for messages sent to or from the first machine over the data network ring,
    wherein any one of the modules in the second group may operate as a proxy that is responsible for messages sent to or from the second machine over the data network ring;
    wherein the module operating as a proxy on the first machine is responsible for messages involving another module operating on the first machine;
    wherein the module operating as a proxy on the second machine is responsible for messages involving another module operating on the second machine.

2. The system of claim 1 wherein the modules of the first and second groups handle data views.

3. The system of claim 2 further comprising:
    a message that is created by a module in the first group and sent to the proxy of the first group,
    said first group's proxy sending the message over the data network ring to the proxy of the second group,
    said second group's proxy sending the message to the other modules in the second group.

4. The system of claim 1 further comprising:
    a distributed message ring class that provides methods and data structures by which the proxies of the first and second groups are to operate as proxies, said proxies of the first and second groups being instantiations of the distributed message ring class.

5. The system of claim 4 wherein the first machine has a first data network ring instance, and the second machine has a second data network ring instance, wherein the first and second ring instances form the data network ring.

6. The system of claim 5 wherein each module in the first and second groups has a logical interface to the data network ring.

7. The system of claim 6 wherein each module in the first and second groups are equal members of the data network ring.

8. The system of claim 7 wherein each module in the first and second groups share any overhead to implement the data network ring.

9. The system of claim 1 further comprising:
a cooperative proxy election mechanism wherein another module of the first group is selected as a new proxy for the first group based upon the proxy of the first group being closed.

10. The system of claim 9 wherein proxy election for the first group is solely contained and conducted by the modules in the first group;
wherein the first group includes only a single proxy that is responsible for messages involving the first group.

11. The system of claim 1 further comprising:
a cooperative proxy election mechanism wherein another module of the first group is selected as a new proxy for the first group based upon the proxy of the first group being deconstructed.

12. The system of claim 1 further comprising:
a threading mechanism used by the proxies of the first and second groups to handle messages sent to their respective machines.

13. The system of claim 12 wherein messages are sent over the data network ring asynchronously so that the sending module does not block the hosting thread of execution.

14. The system of claim 1 wherein the computer modules are objects with methods and data structures.

15. The system of claim 1 wherein ultimate source of a message sent over the data network ring is unknown by ultimate recipient of the message.

16. The system of claim 1 wherein the modules in the first and second groups communicate among themselves anonymously.

17. The system of claim 1 wherein the modules in the first and second groups communicate among themselves at a peer-to-peer level.

18. The system of claim 1 wherein the modules in the first and second groups communicate among themselves at an object level.

19. The system of claim 1 wherein scope of a data network ring is based upon a pre-selected level.

20. The system of claim 19 wherein the preselected level is selected from the group consisting of process level, machine level, and network level.

21. The system of claim 1 wherein at least a portion of the first group's modules are used within a web browser.

22. The system of claim 1 wherein at least a portion of the first group's modules are multiple instances of an application running.

23. The system of claim 1 wherein process-level status propagation messages are sent over the data network ring.

24. The system of claim 1 wherein the modules of the first group perform non-proxy operations;
wherein the proxy module of the first group operates in role of a proxy as well as performs non-proxy operations.

25. The system of claim 24 wherein a non-proxy operation includes a data view operation.

26. A computer-implemented system for communicating among a plurality of computer-based machines interconnected through a network, comprising the steps of
means for operating a first group of computer modules on a first machine;
wherein a second group of computer modules operates on a second machine;
means for exchanging messages between the first group and second group of modules over a data network ring, wherein any one of the modules in the first group may operate as a proxy that is responsible for messages sent to or from the first machine over the data network ring, wherein any one of the modules in the second group may operate as a proxy that is responsible for messages sent to or from the second machine over the data network ring; and
means for operating a module of the first group as a proxy on the first machine such that the proxy is responsible for messages involving another module operating on the first machine.

27. A computer-implemented method for communicating among a plurality of computer-based machines interconnected through a network, comprising the steps of:
operating a first group of computer modules on a first machine;
operating a second group of computer modules on a second machine;
exchanging messages between the first group and second group of modules over a data network ring, wherein any one of the modules in the first group may operate as a proxy that is responsible for messages sent to or from the first machine over the data network ring, wherein any one of the modules in the second group may operate as a proxy that is responsible for messages sent to or from the second machine over the data network ring;
wherein the module operating as a proxy on the first machine is responsible for messages involving another module operating on the first machine;
wherein the module operating as a proxy on the second machine is responsible for messages involving another module operating on the second machine.

28. The method of claim 27 wherein the modules of the first and second groups handle data views.

29. The method of claim 28 further comprising:
a message that is created by a module in the first group and sent to the proxy of the first group,
said first group's proxy sending the message over the data network ring to the proxy of the second group,
said second group's proxy sending the message to the other modules in the second group.

30. The method of claim 27 further comprising:
using a distributed message ring class that provides methods and data structures by which the proxies of the first and second groups are to operate as proxies, said proxies of the first and second groups being instantiations of the distributed message ring class.

31. The method of claim 30 wherein the first machine has a first data network ring instance, and the second machine has a second data network ring instance, wherein the first and second ring instances form the data network ring.

32. The method of claim 31 wherein each module in the first and second groups has a logical interface to the data network ring.

33. The method of claim 32 wherein each module in the first and second groups are equal members of the data network ring.

34. The method of claim 33 wherein each module in the first and second groups share overhead to implement the data network ring.

35. The method of claim 27 wherein another module of the first group is selected as a new proxy for the first group based upon the proxy of the first group being closed.

36. The method of claim 35 wherein proxy election for the first group is solely contained and conducted by the modules in the first group;

wherein the first group includes only a single proxy that is responsible for messages involving the first group.

37. The method of claim 27 wherein another module of the first group is selected as a new proxy for the first group based upon the proxy of the first group being deconstructed.

38. The method of claim 27 wherein a threading mechanism is used by the proxies of the first and second groups to handle messages sent to their respective machines.

39. The method of claim 38 wherein messages are sent over the data network ring asynchronously so that the sending module does not block the hosting thread of execution.

40. The method of claim 27 wherein the computer modules are objects with methods and data structures.

41. The method of claim 27 wherein ultimate source of a message sent over the data network ring is unknown by ultimate recipient of the message.

42. The method of claim 27 wherein the modules in the first and second groups communicate among themselves anonymously.

43. The method of claim 27 wherein the modules in the first and second groups communicate among themselves at a peer-to-peer level.

44. The method of claim 27 wherein the modules in the first and second groups communicate among themselves at an object level.

45. The method of claim 27 wherein scope of a data network ring is based upon a pre-selected level.

46. The method of claim 45 wherein the preselected level is selected from the group consisting of process level, machine level, and network level.

47. The method of claim 27 wherein at least a portion of the first group's modules are used within a web browser.

48. The method of claim 27 wherein at least a portion of the first group's modules are multiple instances of an application running.

49. The method of claim 27 wherein process-level status propagation messages are sent over the data network ring.

50. The method of claim 27 wherein the modules of the first group perform non-proxy operations;

wherein the proxy module of the first group operates in role of a proxy as well as performs non-proxy operations.

51. The method of claim 50 wherein a non-proxy operation includes a data view operation.

* * * * *

UNITED STATES PATENT AND TRADEMARK OFFICE
CERTIFICATE OF CORRECTION

| | | |
|---|---|---|
| PATENT NO. | : 7,191,224 B2 | Page 1 of 1 |
| APPLICATION NO. | : 10/074984 | |
| DATED | : March 13, 2007 | |
| INVENTOR(S) | : Mebane, III | |

It is certified that error appears in the above-identified patent and that said Letters Patent is hereby corrected as shown below:

In Column 9, line 65, delete "of" and insert -- of: --.

In Column 11, line 25, delete "The-method" and insert -- The method --.

Signed and Sealed this

Twenty-sixth Day of February, 2008

JON W. DUDAS
*Director of the United States Patent and Trademark Office*